(12) United States Patent
Shi

(10) Patent No.: US 11,603,677 B1
(45) Date of Patent: Mar. 14, 2023

(54) SPA BATHTUB AND OPERATING UNIT FOR THE SPA BATHTUB

(71) Applicant: Dongguan Hongyu Plastic Co., Ltd, Dongguan (CN)

(72) Inventor: Juying Shi, Dongguan (CN)

(73) Assignee: Dongguan Hongyu Plastic Co., Ltd.

( * ) Notice: Subject to any disclaimer, the term of this patent is extended or adjusted under 35 U.S.C. 154(b) by 0 days.

(21) Appl. No.: 17/714,604

(22) Filed: Apr. 6, 2022

(51) Int. Cl.
| | |
|---|---|
| E04H 4/12 | (2006.01) |
| A47K 3/10 | (2006.01) |
| A47K 3/02 | (2006.01) |
| F04B 17/03 | (2006.01) |
| E04H 4/00 | (2006.01) |
| F04B 43/14 | (2006.01) |
| F16K 31/08 | (2006.01) |

(52) U.S. Cl.
CPC .............. *E04H 4/1245* (2013.01); *A47K 3/02* (2013.01); *A47K 3/10* (2013.01); *E04H 4/0025* (2013.01); *E04H 4/129* (2013.01); *F04B 17/03* (2013.01); *F04B 43/14* (2013.01); *F16K 31/084* (2013.01)

(58) Field of Classification Search
CPC ........... F16K 31/08–084; F16K 15/021; F16K 11/0836; E04H 4/0006; E04H 4/12; E04H 4/1245; E04H 4/129; E04H 4/169; A63B 69/125; A61H 35/00–04; A61H 33/6057; A61H 33/0095; A61H 33/063; A61H 33/6026; A61H 33/0087–028; A61H 33/00; A61H 2033/021–023
USPC .................................................... 137/115.05
See application file for complete search history.

(56) References Cited

U.S. PATENT DOCUMENTS

| | | | | |
|---|---|---|---|---|
| 4,857,112 A | * | 8/1989 | Franninge | E03C 1/304 134/25.4 |
| 4,874,012 A | * | 10/1989 | Velie | F16K 17/34 137/557 |
| 6,412,123 B1 | * | 7/2002 | Lau | A61H 33/60 4/492 |

(Continued)

FOREIGN PATENT DOCUMENTS

| | | | | |
|---|---|---|---|---|
| DE | 19606370 | * | 2/1996 | ......... A61H 33/0087 |
| DE | 202008010345 | * | 10/2008 | ............ E04H 4/1636 |
| EP | 3800387 | * | 4/2021 | ............ F16K 31/084 |

*Primary Examiner* — David P Angwin
*Assistant Examiner* — Nicholas A Ros
(74) *Attorney, Agent, or Firm* — Conley Rose, P.C.

(57) ABSTRACT

A SPA bathtub and an operating unit therefore are provided. The operating unit includes a water circulation system including a diaphragm self-priming pump, a peristaltic pump, a water circulation pipeline, and a fluid switch assembly. The diaphragm self-priming pump operates before the peristaltic pump operates normally and stops operating after the peristaltic pump operates normally. During operation of the diaphragm self-priming pump, the fluid switch assembly is in a first operation state, so that water from the interior volume portion sequentially flows through the peristaltic pump, the diaphragm self-priming pump, the fluid switch assembly, and the water circulation pipeline and finally returns to the interior volume portion. During operation of the peristaltic pump, the fluid switch assembly is in a second operation state, so that the water sequentially flows through the peristaltic pump, the fluid switch assembly, and the water circulation pipeline and finally returns to the interior volume portion.

18 Claims, 8 Drawing Sheets

(56) References Cited

U.S. PATENT DOCUMENTS

| | | | | |
|---|---|---|---|---|
| 7,461,416 B2* | 12/2008 | Stover | ............... | E04H 4/129 |
| | | | | 4/493 |
| 8,095,998 B2* | 1/2012 | Lau | ............... | A61H 33/6005 |
| | | | | 4/492 |
| 11,111,923 B2* | 9/2021 | Dorsey | ............... | E04H 4/12 |
| 2015/0184870 A1* | 7/2015 | Bernardo | ............... | F16K 11/06 |
| | | | | 126/646 |
| 2015/0377497 A1* | 12/2015 | Haws | ............... | F24D 17/0078 |
| | | | | 122/13.3 |

* cited by examiner (A)

(B)

(C)

(D)

SPA BATHTUB AND OPERATING UNIT FOR THE SPA BATHTUB

TECHNICAL FIELD

The present description relates to the technical field of SPA (Solus Par Agula) bathtubs, and in particular to a SPA bathtub and an operating unit for the SPA bathtub.

BACKGROUND

This section provides background information related to the present description, but the information does not necessarily constitute the prior art.

In a SPA bathtub, a water circulation system for circulating water in the bathtub is usually provided to assist in achieving the functions such as heating and filtering, and optionally a gas supply system for supplying gas to an interior volume portion of the bathtub further may be provided so as to realize a surfing function of the SPA bathtub. In the above, the water pumps conventionally adopted for water circulation are mainly divided into three types: diaphragm self-priming pump, peristaltic pump, and submersible pump. The diaphragm self-priming pump has a self-priming capability. The flow rate of the diaphragm self-priming pump is small. An installation position of the peristaltic pump in normal operation needs to be lower than a water level in the bathtub, otherwise, the peristaltic pump needs to be evacuated by filling and guiding water before normal operation. An installation position of the submersible pump in normal operation must be lower than the water level in the bathtub. Due to the limitation of usage environments of the SPA bathtub, it is often inconvenient to fix a water pump, an electric gas pump, or the like, in a position lower than the water level in the bathtub, resulting in use restriction to the SPA bathtub. In addition, in the current SPA bathtubs, the electric gas pumps are always connected to the bathtub and in communication with a water body in the bathtub. Therefore, a valve must be connected between the water body in the bathtub and the electric gas pump so as to avoid the water body in the bathtub entering the electric gas pump. In the relevant technical field, a mechanical reflux valve or an electromagnetic valve is usually installed to function as a switch. The disadvantage of the mechanical reflux valve is that the work is relatively damaged, thus increasing the resistance of the electric gas pump. The electromagnetic valve has the disadvantages of a small discharge amount and an expensive price.

Therefore, it is necessary to provide an improved water circulation system and an improved gas supply system for the SPA bathtubs, so that on one hand, the operation of the SPA bathtubs can be conveniently carried out, and on the other hand, they are not restricted by the use environments of the SPA bathtubs, thereby at least solving one or all of the above problems.

SUMMARY

This section provides a general summary of the description. A comprehensive description of a full scope or all features description are described below in the Detailed Description.

In some examples, the present description provides an operating unit for a SPA bathtub, the operating unit detachably attached to the SPA bathtub, and the operating unit including a water circulation system for performing out-of-bathtub circulation on water in the SPA bathtub. The water circulation system includes a diaphragm self-priming pump, a peristaltic pump, a water circulation pipeline, and a fluid switch assembly connecting the diaphragm self-priming pump and the peristaltic pump with the water circulation pipeline. The peristaltic pump is provided in such a manner that an inlet of the peristaltic pump can be in fluid communication with an interior volume portion of the SPA bathtub and an outlet of the peristaltic pump is in fluid communication with an inlet of the fluid switch assembly. The diaphragm self-priming pump is provided in such a manner that an inlet of the diaphragm self-priming pump is in fluid communication with the outlet of the peristaltic pump and an outlet of the diaphragm self-priming pump can be in fluid communication with an outlet of the fluid switch assembly. The water circulation pipeline is provided in such a manner that an inlet of the water circulation pipeline is in fluid communication with the outlet of the fluid switch assembly and the outlet of the water circulation pipeline is in fluid communication with the interior volume portion of the SPA bathtub. The diaphragm self-priming pump, the peristaltic pump, and the fluid switch assembly are configured to cooperate with each other in such a manner that: the diaphragm self-priming pump operates before the peristaltic pump operates normally and stops operating after the peristaltic pump operates normally, and the fluid switch assembly has a first operation state and a second operation state. During the operation of the diaphragm self-priming pump, the fluid switch assembly is in the first operation state, so that the water from the interior volume portion of the SPA bathtub flows through the peristaltic pump, the diaphragm self-priming pump, the fluid switch assembly, and the water circulation pipeline in sequence and finally returns back to the interior volume portion of the SPA bathtub, and during the operation of the peristaltic pump, the fluid switch assembly is in the second operation state, so that the water from the interior volume portion of the SPA bathtub flows through the peristaltic pump, the fluid switch assembly, and the water circulation pipeline in sequence and finally returns back to the interior volume portion of the SPA bathtub.

For the water circulation system of the operating unit for the SPA bathtub according to some examples of the present description, through the cooperation between the diaphragm self-priming pump, the peristaltic pump, and the fluid switch assembly, the installation and the use of the water circulation system of the bathtub are no longer restricted by the water level in the bathtub, and the water circulation of the water in the SPA bathtub still can be realized even in the case of a low water level, thus assisting in realizing the function of heating or filtering the water in the SPA bathtub, so that the problem of having to be installed at a low water level is resolved in the related technical field. The operating unit for the SPA bathtub according to the examples of the present description is easier to install and use, and has wider application scenarios.

In some examples of the present description, the fluid switch assembly may include a housing member. A first cavity and a second cavity are provided in the housing member along a longitudinal direction of the housing member. The first cavity and the second cavity are in fluid communication with each other via a first opening. The outlet of the peristaltic pump and the inlet of the diaphragm self-priming pump are both in fluid communication with the first cavity. The outlet of the diaphragm self-priming pump and the inlet of the water circulation pipeline are both in fluid communication with the second cavity. The fluid switch assembly further includes a fluid switch piston. The fluid switch piston is received in the second cavity and can move in the second cavity. During operation of the diaphragm self-priming pump, the fluid switch piston is located in a first operating position so as to close the first opening, and during operation of the peristaltic pump, the fluid switch piston moves from the first operating position to a second operating position. The second position allows fluid communication between the first cavity and the second cavity.

In some examples of the present description, the fluid switch assembly further may include at least one first magnet positioned in the second cavity and at least one second magnet positioned on the fluid switch piston and opposite to the first magnet. The first magnet and the second magnet are provided in such a manner that ends having the same polarity are opposite to each other. An interaction force between the first magnet and the second magnet is set to be suitable for maintaining the fluid switch piston in the first operating position and less than an operating fluid pressure of the peristaltic pump.

In some examples of the present description, the fluid switch assembly further may include a biasing device mounted in the second cavity. The biasing device abuts against the fluid switch piston and applies a biasing force to the fluid switch piston towards the first operating position. The sum of the biasing force and the interaction force between the first magnet and the second magnet is less than the operating fluid pressure of the peristaltic pump.

In some examples of the present description, the operating unit further includes a plurality of sensors and a control panel in communication with the plurality of sensors. The plurality of sensors are configured to measure an operation state of the SPA bathtub and send to the control panel a signal indicating the operation state of the SPA bathtub. The control panel is configured to receive an external input instruction to control the operation of the SPA bathtub and the signal indicating the operation state of the SPA bathtub and to convert the external input instruction and the signal into a physical operation command for the SPA bathtub.

In some examples of the present description, the operating unit further may include a heater configured to heat the water circulation pipeline, and particularly, the heater is a PTC heater. The heater is in communication with the control panel. The plurality of sensors include an inductor provided at an outside of the housing member. The inductor is positioned close to an end of the first magnet facing the second magnet and is configured to: send a first output signal to the control panel when a distance between the second magnet and the first magnet is less than or equal to a preset spacing value, so as to generate an operation command used to make the heater start operating, and send a second output signal to the control panel when the distance between the second magnet and the first magnet is greater than the preset spacing value, so as to generate an operation command used to make the heater stop operating.

For the water circulation system of the operating unit for the SPA bathtub according to some examples of the present description, through the design of at least one first magnet and at least one second magnet in the fluid switch assembly, when the water flow and the water pressure are insufficient, the fluid switch piston leaves the first magnet due to the interaction force between the first magnet and the second magnet and leaves the inductor, and the inductor notifies the control panel to send a signal used for stopping heating, and when the distance between the second magnet and the first magnet is greater than the preset spacing value, thus preventing dry burning and overheating of the heater, so that the use of the bathtub is more safe and more reliable.

In some examples of the present description, the plurality of sensors further may include at least one temperature sensor and/or a leakage inductor provided on the housing member of the fluid switch assembly. The leakage inductor is configured to send a signal to the control panel for generating an operation command used to make the operating unit powered off, when sensing that a current whose value is greater than a preset current value is present in water flowing through the fluid switch assembly, and the at least one temperature sensor is configured to send a signal to the control panel for generating the operation command used to make the heater stop operating, when the temperature of the water flowing through the fluid switch assembly is higher than a preset temperature value.

In some examples of the present description, the operating unit further may include an electric gas pump and an electric gas valve, the electric gas pump is configured to be able to be in fluid communication with the SPA bathtub through the electric gas valve and at least one gas path connecting pipe. The electric gas valve includes a valve housing defining at least one inner cavity. The valve housing is provided with a gas inlet configured to be in communication with the electric gas pump, and at least one gas outlet each configured to be in communication with corresponding one of the at least one gas path connecting pipe. The at least one inner cavity is each in fluid communication with a corresponding gas path connecting pipe via one gas outlet, and each inner cavity is provided therein with a moving piston. The electric gas pump and the electric gas valve are in communication with the control panel so as to cooperate with each other in such a manner that: during operation of the electric gas pump, the moving piston in the electric gas valve is located in a communication position such that the corresponding gas outlet is opened to allow the fluid communication between the electric gas pump and the gas path connecting pipe, and when the electric gas pump receives from the control panel the operation command used for stopping operating, the moving piston in the electric gas valve moves towards an off position where the corresponding gas outlet is able to be closed to block the fluid communication between the electric gas pump and the gas path connecting pipe, and the electric gas pump stops operating when the moving piston in the electric gas valve reaches the off position.

For the gas supply system of the operating unit for the SPA bathtub according to the examples of the present description, through the design of the moving piston in the electric gas valve in the operating unit for the SPA bathtub, it is realized that large flow of gas can be supplied when using the electric gas pump to supply gas, and meanwhile the resistance to the electric gas pump is also reduced, thereby improving efficiency of supplying gas to the bathtub.

In some examples of the present description, the electric gas valve further may include an electric motor positioned on the valve housing and used for driving the moving piston, the electric motor is configured to be rotatable in a first direction and a second direction opposite to each other and includes a driving gear on an output shaft of the electric motor, and the moving piston is configured to be coupled to a rack configured to be meshed with the driving gear of the electric motor, such that through the meshing between the driving gear and the rack, the moving piston can move towards the communication position when the electric motor is rotated in the first direction, and move towards the off position when the electric motor is rotated in the second direction.

In some examples of the present description, a stop portion can be provided in each inner cavity of the valve housing, the stop portion is configured to enable the moving piston completely closes the gas outlet when abutting against the stop portion, the electric gas valve is in communication with the control panel, and the electric motor operates according to the physical operation command from the control panel, so that when the electric gas pump receives the operation command used for stopping operating, the moving piston is enabled by the electric motor to move back to a state of abutting against the stop portion.

In some examples of the present description, the at least one gas path connecting pipe can be configured to be capable of being in fluid communication with the interior volume portion of the SPA bathtub.

In some examples of the present description, the SPA bathtub can be an inflatable bathtub, the operating unit can include two gas path connecting pipes respectively in communication with two inner cavities of the electric gas valve, a first gas path connecting pipe in the two gas path connecting pipes is configured to be capable of being connected with an inflation valve of the inflatable bathtub, so that gas from the electric gas pump can be charged into the interior of a bathtub wall of the inflatable bathtub via the inflation valve to inflate the inflatable bathtub, and a second gas path connecting pipe in the two gas path connecting pipes is configured to be capable of being in fluid communication with the interior volume portion of the inflatable bathtub, so that gas from the electric gas pump can be supplied into the interior volume portion of the inflatable bathtub.

In some examples of the present description, the operating unit can include a first electric motor configured to drive a first moving piston provided in a first inner cavity in communication with the first gas path connecting pipe, and a second electric motor configured to drive the second moving piston provided in the second inner cavity in communication with the second gas path connecting pipe, the first electric motor and the second electric motor can be independently operated, and the first electric motor and the second electric motor are configured to cooperate with each other in such a manner that: when the first electric motor is rotated in the first direction to drive the first moving piston to move towards the communication position, the second electric motor is not operated, or the second electric motor is rotated in the second direction to drive the second moving piston to move towards the off position; and when the second electric motor is rotated in the first direction to drive the second moving piston to move towards the communication position, the first electric motor is not operated, or the first electric motor is rotated in the second direction to drive the first moving piston to move towards the off position.

In some examples of the present description, the operating unit further may include a gas pressure monitoring device configured to detect the gas pressure inside the inflatable bathtub, and the gas pressure monitoring device sends, when detecting that the gas pressure inside the inflatable bathtub reaches or is greater than a predetermined gas pressure value, a signal to the control panel, so as to generate a physical operation command used for making the first electric motor rotate in the second direction so as to drive the first moving piston to move towards the off position.

In some examples of the present description, the operating unit can be provided inside the SPA bathtub in a threaded connection manner, or provided outside the SPA bathtub through a hooking device.

The operating unit for the SPA bathtub according to some examples of the present description may have a fixed style, can be used with more kinds of bathtubs, can be provided inside the SPA bathtub in a threaded connection manner or outside the SPA bathtub through a hooking device, then it has richer usage scenarios, and wider application scenes, and meanwhile reduces the cost of repeated molding.

In some examples, the present description provides the SPA bathtub. The SPA bathtub includes the operating unit according to the various examples of the present description.

By using the operating unit according to the various examples of the present description, the SPA bathtub, according to the various examples of the present description, enables the use of the bathtub to be no longer restricted by the water level in the bathtub, so that water circulation of the water in the SPA bathtub still can be realized even in the case of a low water level, thereby assisting in realizing heating or filtering of the water in the SPA bathtub, so that the problem of having to be installed at a low water level is resolved in the related technical field. The installation of the operating unit for the SPA bathtub according to some examples of the present description no longer needs a fixed height, enabling easier installation and use. The operating unit for the SPA bathtub according to various examples of the present description may have a fixed style, and can be used with more kinds of bathtubs, then it has richer usage scenarios, and wider application scenes, and meanwhile reduces the cost of repeated molding.

BRIEF DESCRIPTION OF DRAWINGS

Through the following description with reference to the accompanying drawings, the features and advantages of the examples of the present description will become easier to understand. The accompanying drawings are not drawn to scale. Some features are zoomed in or out to show details of specific parts. In the drawings.

DETAILED DESCRIPTION

Figure 1:
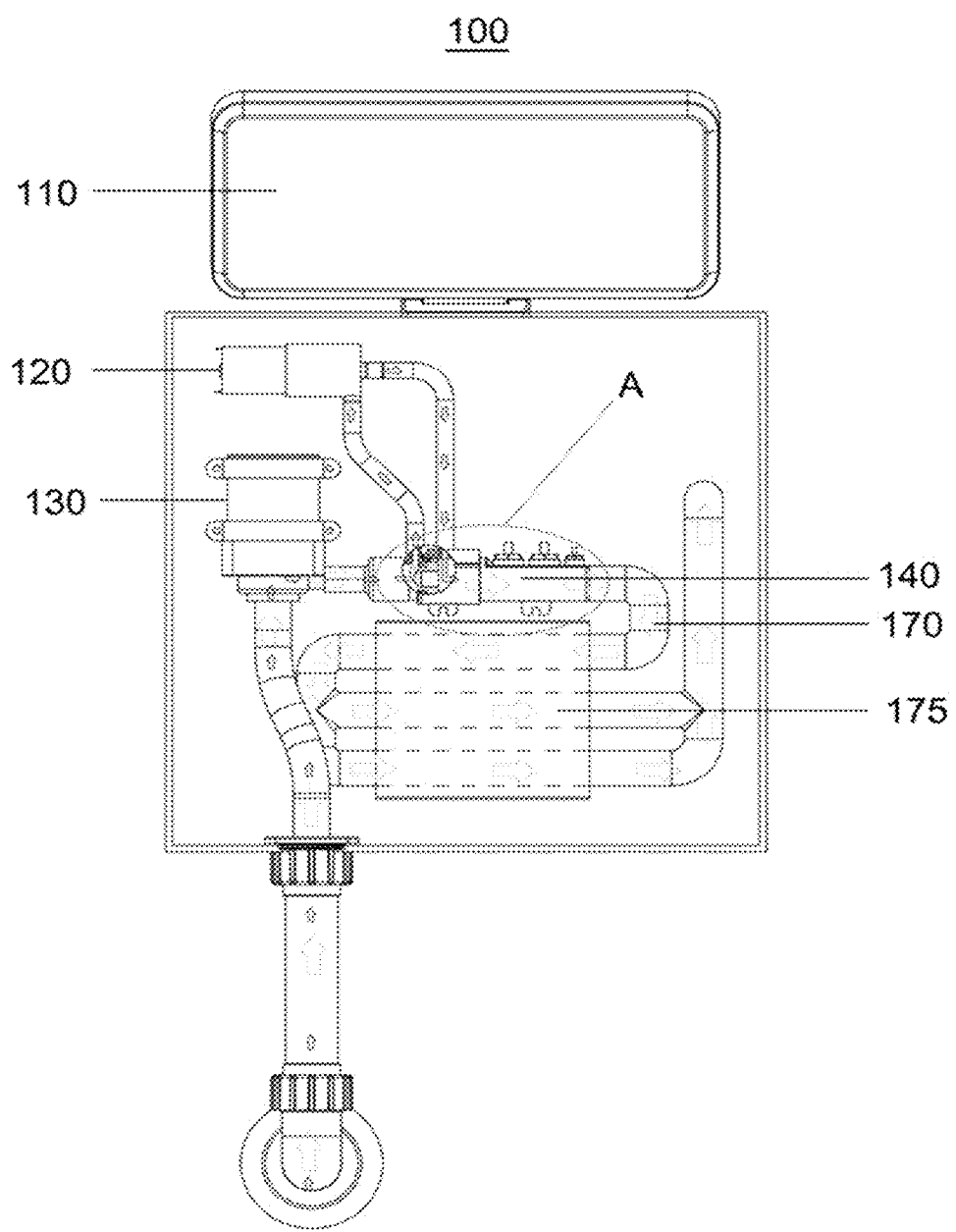
FIG. 1 shows a schematic view of an operating unit for a SPA bathtub according to some examples of the present description.

The present description will be described in detail by means of various examples of the present description with reference to the accompanying drawings. It should be noted that the following detailed description of the present description is merely for illustrative purpose, but is in no way limitation to the present description. Besides, the same reference signs are used to denote the same components in various accompanying drawings.

It should also be pointed out that, for the sake of clarity, not all of the features of actual specific examples are described and shown in the description and accompanying drawings, and furthermore, in order to avoid obscuring the technical solutions focused in the present description with unnecessary details, in the description and the accompanying drawings, only arrangements and structures closely related to the technical contents of the present description are described and shown, while other details that are not relevant to the technical contents of the present description and are known to those skilled in the art are omitted.

In order to make objectives, technical solutions, and advantages of the various examples of the present description clearer, various examples of the present description will be described in detail below in conjunction with accompanying drawings. However, those of ordinary skill in the art could understand that in various examples of the present description, many technical details are provided for the readers to better understand the present description. However, even without these technical details and various changes and modifications based on respective following examples, the technical solutions claimed in the present description can also be realized. The division of various following examples are for the convenience of description, and should not constitute any limitation on the specific implementation manner of the present description, and various examples may be combined with each other and refer to each other without contradiction.

It should be indicated that terms "first", "second" and so on in the description, the claims, and the above accompanying drawings of the present description are used for distinguishing similar objects, are not necessarily used to describe a specific order or sequence, and should not be construed as indicating or implying importance in the relativity or suggesting the number of indicated technical features. Thus, a feature defined with "first" or "second" may explicitly or implicitly mean including one or more such features. It should be understood that the terms used in this way can be exchangeable under appropriate circumstances, so that the various examples of the present description described herein can be implemented in an order other than those illustrated or described herein. Besides, terms "include (comprise)", "have", and any derivatives thereof are intended to be non-exclusive, for example, a process, a method, a system, a product or a device that contains a series of steps or units is not necessarily limited to those steps or units expressly listed, but may include other steps or units not expressly listed or inherent to such process, method, product or device.

Various examples of an operating unit for a SPA bathtub according to the present description will be described in detail with reference to the accompanying drawings.

FIG. 1 is a schematic view showing the operating unit for the SPA bathtub according to some examples of the present description.

As shown in FIG. 1, an operating unit 100 for the SPA bathtub according to some examples of the present description is detachably attached to the SPA bathtub. The operating unit 100 may include a water circulation system for performing out-of-bathtub circulation on water in the SPA bathtub. The water circulation system may include a diaphragm self-priming pump 120, a peristaltic pump 130, a water circulation pipeline 170, and a fluid switch assembly 140 connecting the diaphragm self-priming pump 120 and the peristaltic pump 130 with the water circulation pipeline 170. The peristaltic pump 130 may be provided in such a manner that: an inlet of the peristaltic pump 130 can be in fluid communication with an interior volume portion of the SPA bathtub and an outlet of the peristaltic pump 130 is in fluid communication with an inlet of the fluid switch assembly 140. The diaphragm self-priming pump 120 may be provided in such a manner that an inlet of the diaphragm self-priming pump 120 is in fluid communication with the outlet of the peristaltic pump 130 and an outlet of the diaphragm self-priming pump 120 can be in fluid communication with an outlet of the fluid switch assembly 140. The water circulation pipeline 170 may be provided in such a manner that: an inlet of the water circulation pipeline 170 is in fluid communication with the outlet of the fluid switch assembly 140; and the outlet of the water circulation pipeline 170 is in fluid communication with the interior volume portion of the SPA bathtub. The diaphragm self-priming pump 120, the peristaltic pump 130, and the fluid switch assembly 140 are configured to cooperate with each other in such a manner that: the diaphragm self-priming pump 120 operates before the peristaltic pump 130 operates normally and stops operating after the peristaltic pump 130 operates normally, and the fluid switch assembly 140 has a first operation state and a second operation state. During the operation of the diaphragm self-priming pump 120, the fluid switch assembly 140 is in the first operation state, so that the water from the interior volume portion of the SPA bathtub flows through the peristaltic pump 130, the diaphragm self-priming pump 120, the fluid switch assembly 140, and the water circulation pipeline 170 in sequence and finally returns back to the interior volume portion of the SPA bathtub; and during the operation of the peristaltic pump 130, the fluid switch assembly 140 is in the second operation state, so that the water from the interior volume portion of the SPA bathtub flows through the peristaltic pump 130, the fluid switch assembly 140, and the water circulation pipeline 170 in sequence and finally returns back to the interior volume portion of the SPA bathtub.

For the water circulation system of the operating unit for the SPA bathtub according to some examples of the present description, through the cooperation between the diaphragm self-priming pump, the peristaltic pump, and the fluid switch assembly, the installation and the use of the water circulation system of the bathtub are no longer restricted by the water level in the bathtub, and the water circulation of the water in the SPA bathtub still can be realized even in the case of a low water level, thus assisting in realizing the function of heating or filtering the water in the SPA bathtub. The operating unit for the SPA bathtub according to some examples of the present description is easier to install and use, and has wider application scenarios.

Figure 2:
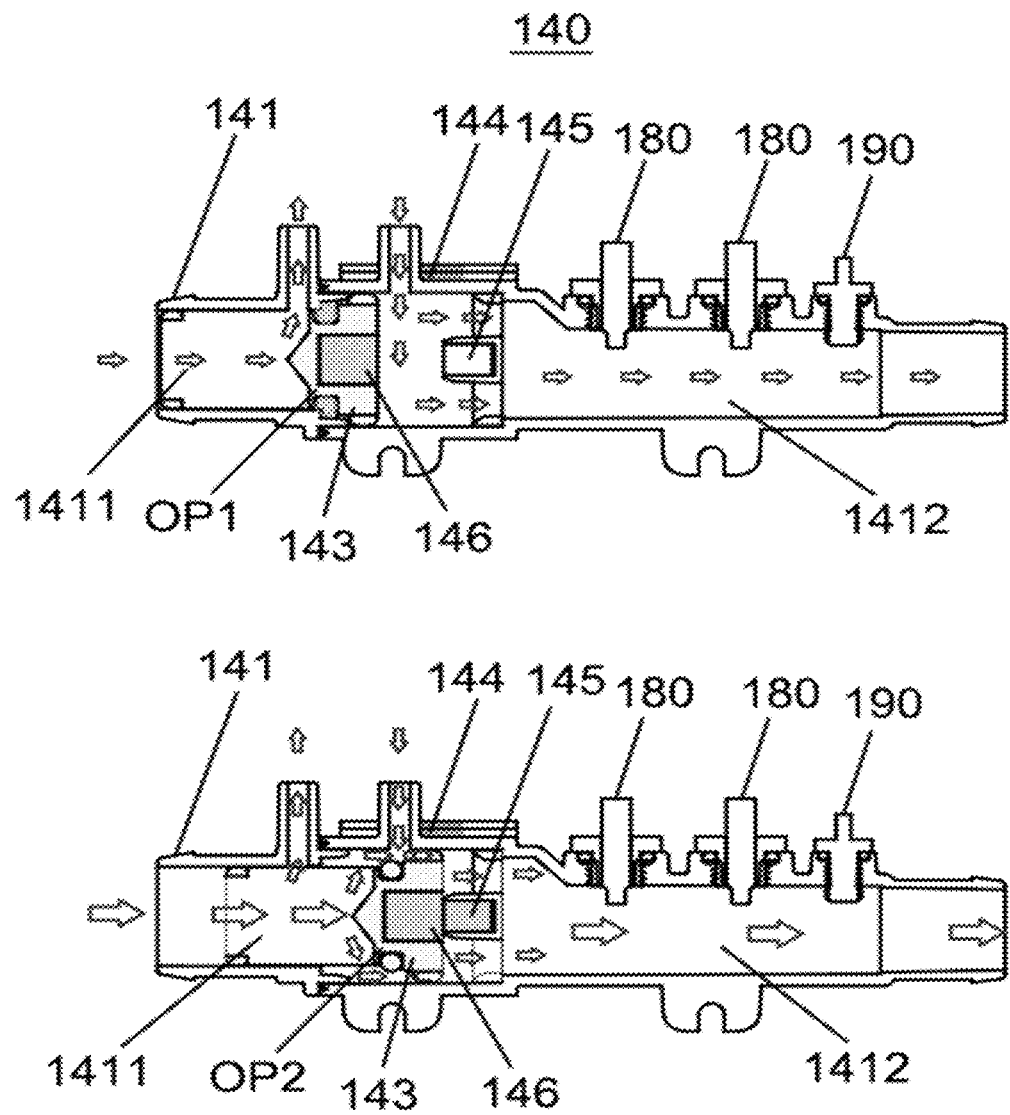
FIG. 2 shows diagrams of working principle of a fluid switch assembly in a water circulation system of an operating unit for a SPA bathtub according to some examples of the present description.

FIG. 2 shows schematic diagrams of working principle of a fluid switch assembly in the water circulation system of an operating unit for the SPA bathtub according to some examples of the present description, and FIG. 2 is a partially enlarged view of portion A of FIG. 1 for the fluid switch assembly. In some examples of the present description, the fluid switch assembly 140 may include a housing member 141, and a first cavity 1411 and a second cavity 1412 are provided in the housing member 141 along a longitudinal direction of the housing member 141. The first cavity 1411 and the second cavity 1412 are in fluid communication with each other via a first opening, the outlet of the peristaltic pump 130 and the inlet of the diaphragm self-priming pump 120 are in fluid communication with the first cavity 1411, and the outlet of the diaphragm self-priming pump 120 and the inlet of the water circulation pipeline 170 are in fluid communication with the second cavity 1412. The fluid switch assembly 140 further may include a fluid switch piston 143, and the fluid switch piston 143 is received in the second cavity 1412 and can move in the second cavity 1412. During operation of the diaphragm self-priming pump 120, the fluid switch piston 143 is located in a first operating position OP1 so as to close the first opening; and during operation of the peristaltic pump 130, the fluid switch piston 143 moves from the first operating position OP1 to a second operating position OP2 where fluid communication between the first cavity 1411 and the second cavity 1412 is allowed.

With continued reference to FIG. 1 and FIG. 2, in some examples of the present description, the fluid switch assembly 140 further may include: at least one first magnet 145 positioned in the second cavity 1412, and at least one second magnet 146 positioned on the fluid switch piston 143 and opposite to the first magnet 145, the first magnet 145 and the second magnet 146 may be provided in such a manner that ends having the same polarity are opposite to each other. The interaction force between the first magnet 145 and the second magnet 146 may be set to be suitable for maintaining the fluid switch piston 143 in the first operating position OP1 and less than an operating fluid pressure of the peristaltic pump 130.

In some examples of the present description, the fluid switch assembly 140 further may include a biasing device (not shown) mounted in the second cavity 1412, and the biasing device abuts against the fluid switch piston 143 and applies a biasing force to the fluid switch piston 143 towards the first operating position OP1. The sum of the biasing force and the interaction force between the first magnet 145 and the second magnet 146 is less than the operating fluid pressure of the peristaltic pump 130.

In some examples of the present description, the operating unit 100 further may include a plurality of sensors and a control panel 110 in communication with the plurality of sensors. The plurality of sensors are configured to measure an operation state of the SPA bathtub and send to the control panel a signal indicating the operation state of the SPA bathtub 110. The control panel 110 is configured to receive an external input instruction of controlling the operation of the SPA bathtub and the signal indicating the operation state of the SPA bathtub, and convert the external input instruction and the signal into a physical operation command for the SPA bathtub.

Referring to FIG. 1, in some examples of the present description, the operating unit 100 further may include a heater 175 configured to heat the water circulation pipeline 170, and particularly, the heater 175 is a PTC (Positive Temperature Coefficient Ceramic) heater. The heater 175 is in communication with the control panel 110, and the plurality of sensors may include an inductor 144 provided at an outside of the housing member 141. The inductor 144 may be positioned close to an end of the first magnet 145 facing the second magnet 146 and may be configured to: send a first output signal to the control panel 110 when a distance between the second magnet 146 and the first magnet 145 is less than or equal to a preset spacing value, so as to generate an operation command used to make the heater 175 start operating, and send a second output signal to the control panel 110 when the distance between the second magnet 146 and the first magnet 145 is greater than the preset spacing value, so as to generate an operation command used to make the heater 175 stop operating.

For the water circulation system of an operating unit for the SPA bathtub according to some examples of the present description, through the design of at least one first magnet and at least one second magnet in the fluid switch assembly, when the water flow and the water pressure are insufficient, the fluid switch piston leaves the first magnet due to the interaction force between the first magnet and the second magnet and leaves the inductor, and the inductor notifies the control panel to send a signal used for stopping heating, when the distance between the second magnet and the first magnet is greater than the preset spacing value, thus preventing dry burning and overheating of the heater, so that the use of the bathtub is more safe and more reliable.

Referring to FIG. 2, in some examples of the present description, the plurality of sensors further may include at least one temperature sensor 180 and/or a leakage inductor 190 provided on the housing member 141 of the fluid switch assembly 140. The leakage inductor 190 may be configured to send a signal to the control panel 110 when sensing that a current whose value is greater than a preset current value is present in the water flowing through the fluid switch assembly 140, to generate an operation command used to make the operating unit 100 powered off. The at least one temperature sensor is configured to send a signal to the control panel 110 when the temperature of the water flowing through the fluid switch assembly 140 is higher than a preset temperature value, to generate the operation command used to make the heater 175 to stop operating.

In the operating unit for the SPA bathtub according to some examples of the present description, the system further includes a leakage inductor provided in the water circulation system, and the leakage inductor sends a signal to the system, when sensing that a current whose value is greater than a preset current value is present in the water flowing through the fluid switch assembly, so that the system is powered off, thereby making the use of the SPA bathtub according to the various examples of the present description more safe.

Figure 3:
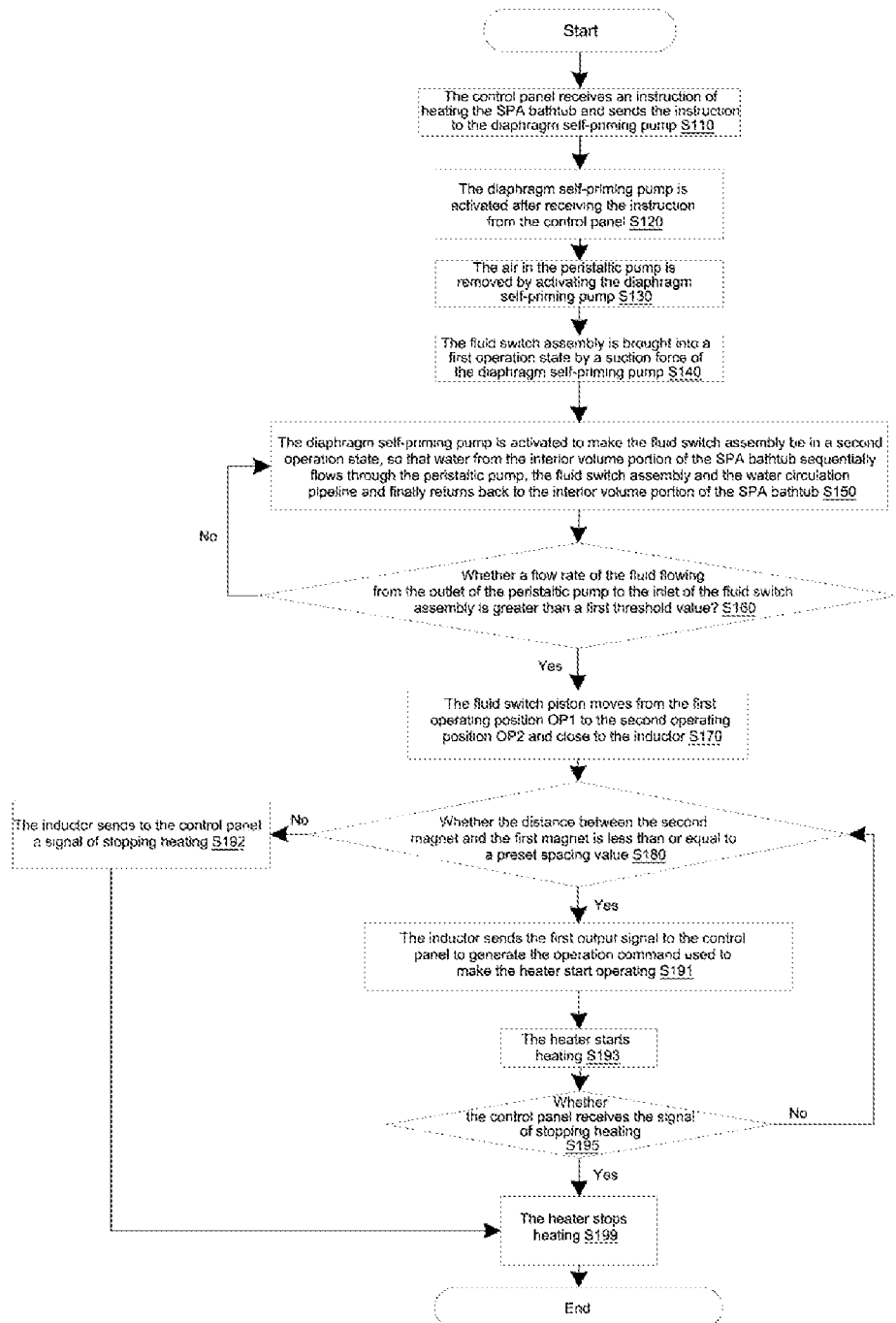
FIG. 3 shows a method of operating a water circulation system of a SPA bathtub according to some examples of the present description.

FIG. 3 shows a method of operating a water circulation system of the SPA bathtub according to various examples of the present description.

In some examples of the present description, as shown in FIG. 3, a method of operating the SPA bathtub according to the present description may include the following steps. In step S110, the control panel receives an instruction of heating the SPA bathtub and sends the instruction to the diaphragm self-priming pump. In step S120, after receiving the instruction from the control panel, the diaphragm self-priming pump is activated. In step S130, the air in the peristaltic pump is removed by activating the diaphragm self-priming pump, so that the peristaltic pump operates normally. In step S140, the fluid switch assembly is brought into the first operation state by a suction force of the diaphragm self-priming pump, so that the water from the interior volume portion of the SPA bathtub sequentially flows through the peristaltic pump, the diaphragm self-priming pump, the fluid switch assembly, and the water circulation pipeline and finally returns back to the interior volume portion of the SPA bathtub. In step S150, the diaphragm self-priming pump is activated, so that the fluid switch assembly is brought into the second operation state, so that the water from the interior volume portion of the SPA bathtub sequentially flows through the peristaltic pump, the fluid switch assembly, and the water circulation pipeline and finally returns back to the interior volume portion of the SPA bathtub.

In step S160, it is judged whether a flow rate of the fluid flowing from the outlet of the peristaltic pump to the inlet of the fluid switch assembly is greater than a first threshold value. Specifically, when the flow rate of the fluid flowing from the outlet of the peristaltic pump to the inlet of the fluid switch assembly is greater than the first threshold value, the fluid pressure in the peristaltic pump is greater than the sum of the biasing force and the interaction force between the first magnet and the second magnet, so that the fluid switch piston moves from the first operating position OP1 to the second operating position OP2. If a positive result is obtained in step S160 (i.e., a judgment result in S160 is "Yes"), the method flow proceeds to step S170. If a negative result is obtained in step S160 (i.e., the judgment result in S160 is "No"), the method flow returns back to step S150. The method flow proceeds to step S160 until a positive result is obtained in step S160.

For the method of operating the SPA bathtub according to various examples of the present description, through the cooperation between the diaphragm self-priming pump, the peristaltic pump, and the fluid switch assembly of the operating unit for the SPA bathtub, the installation and the use of the water circulation system of the bathtub are no longer restricted by the water level in the bathtub, and the water circulation of the water in the SPA bathtub also can be realized even in the case of a low water level, thus assisting in realizing the function of heating or filtering the water in the SPA bathtub, so that the problem of having to be installed at a low water level is resolved in the related technical field. The operating unit for the SPA bathtub according to the various examples of the present description is easier to install and use, and has wider application scenarios.

With continued reference to FIG. 3, the method of operating a water circulation system of the SPA bathtub according to various examples of the present description further includes: in step S170, the fluid switch piston moves from the first operating position OP1 to the second operating position OP2 and is close to the inductor. In step S180, it is judged whether the distance between the second magnet and the first magnet is less than or equal to a preset spacing value. Specifically, when the distance between the second magnet and the first magnet is less than or equal to the preset spacing value, the inductor sends the first output signal to the control panel to generate the operation command used to make the heater start operating. If a positive result is obtained in step S180 (i.e., a judgment result in S180 is "Yes"), the method flow proceeds to step S191. If a negative result is obtained in step S180 (i.e., the judgment result in S180 is "No"), the method flow proceeds to step S192.

In step S191, the inductor sends the first output signal to the control panel to generate the operation command used to make the heater start operating. After step S191, the method flow proceeds to step S193. In step S193, the heater starts heating. After step S193, the method flow proceeds to step S195. In step S195, it is judged whether the control panel receives the signal of stopping heating. If a judgment result in step S195 is "Yes", the method flow proceeds to step S199, and the heater stops heating. If the judgment result in step S195 is "No", the method flow returns back to step S180, and continues to judge whether the distance between the second magnet and the first magnet is less than or equal to the preset spacing value. In step S192, the inductor notifies the control panel to send a signal of stopping heating. Then the method flow proceeds to step S199, and the heater stops heating.

In some examples of the present description, the operating unit is configured for use in the SPA bathtub. In addition, those skilled in the art could use, according to actual needs, the operating unit according to some examples of the present description for a storage device. The storage device is configured to store a fluid, especially water. The operating unit is configured to fluidly circulate the fluid in the storage device to assist in heating or filtering the fluid in the storage device.

For the water circulation system of an operating unit for the SPA bathtub according to various examples of the present description, through using the design of at least one first magnet and at least one second magnet in the fluid switch assembly, when the water flow and the water pressure are insufficient, the fluid switch piston leaves the first magnet due to the interaction force between the first magnet and the second magnet and leaves the inductor, and the inductor notifies, when the distance between the second magnet and the first magnet is greater than the preset spacing value, the control panel to send the signal of stopping heating, thus preventing dry burning and overheating of the heater, so that the use of the bathtub is more safe and more reliable.

Figure 4:
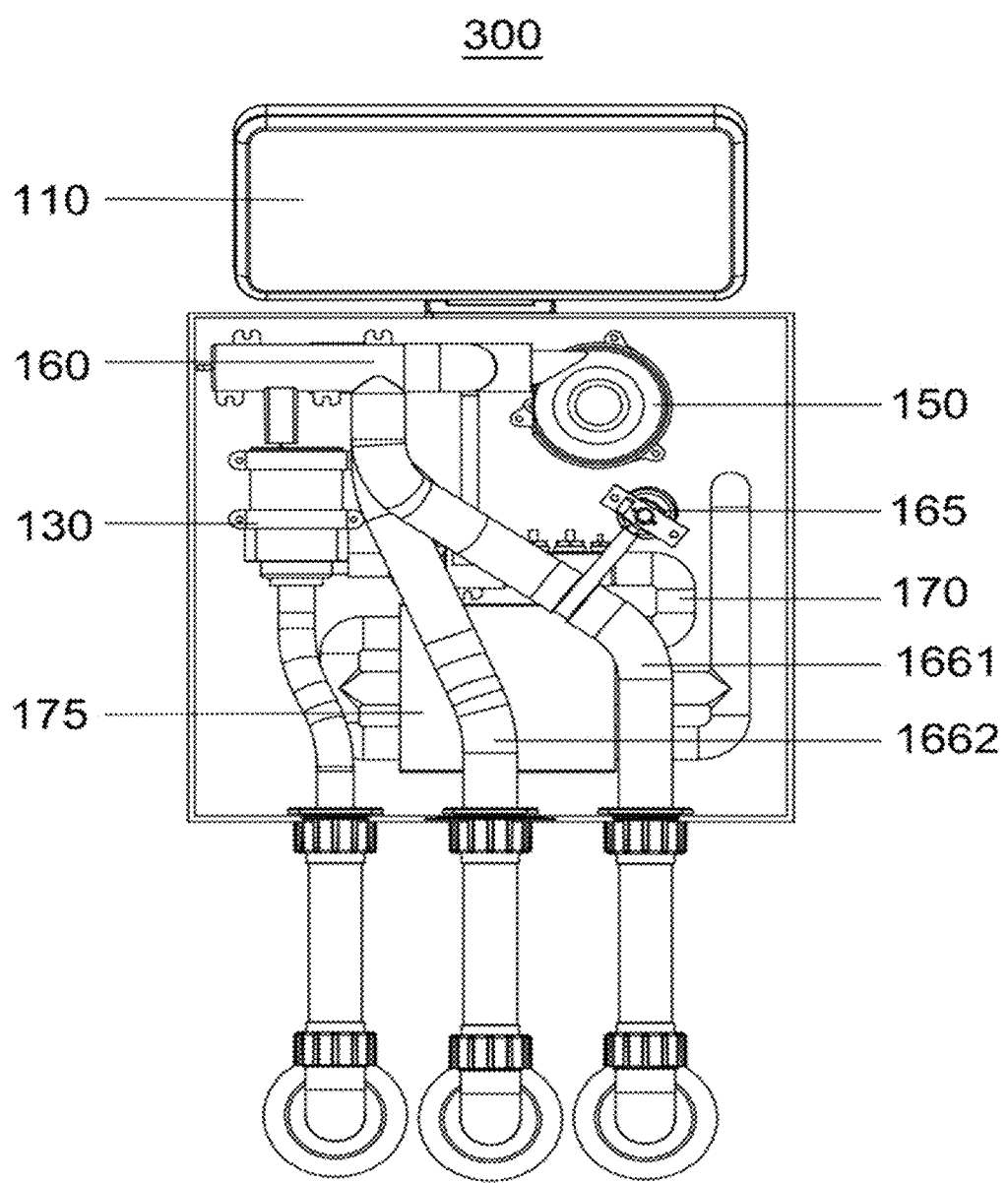
FIG. 4 shows a schematic view of the operating unit for a SPA bathtub according to some examples of the present description, the operating unit including the water circulation system and a gas supply system.

FIG. 4 shows a schematic view of the operating unit for the SPA bathtub according to some examples of the present description, the operating unit including the water circulation system and a gas supply system.

The operating unit 300 for the SPA bathtub according to various examples of the present description may include the water circulation system of the operating unit 100 for the SPA bathtub according to some examples of the present description, and in addition, the operating unit further may include the gas supply system of the operating unit 200 for the SPA bathtub, as will be described in detail below with reference to FIG. 5 to FIG. 8. The water circulation system of the operating unit 100 for the SPA bathtub described in accordance with some examples of the present description is described in detail with reference to FIG. 1 to FIG. 3, and is not repeated herein again. The gas supply system of the operating unit 200 for the SPA bathtub described in accordance with some examples of the present description is described in detail below in connection with FIG. 5 to FIG. 8.

Figure 5:
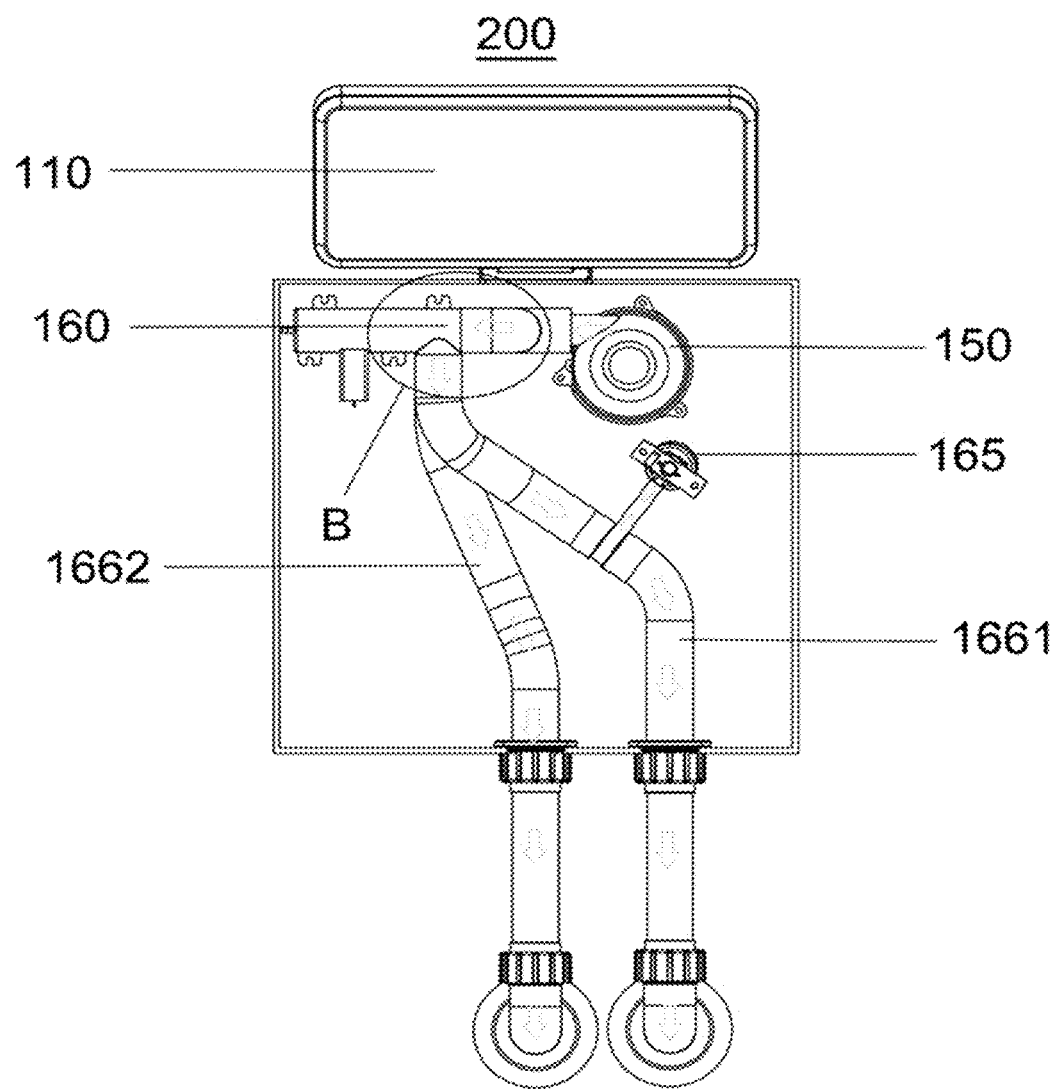
FIG. 5 shows a schematic view of a gas supply system of an operating unit for a SPA bathtub according to some examples of the present description.
Figure 6:
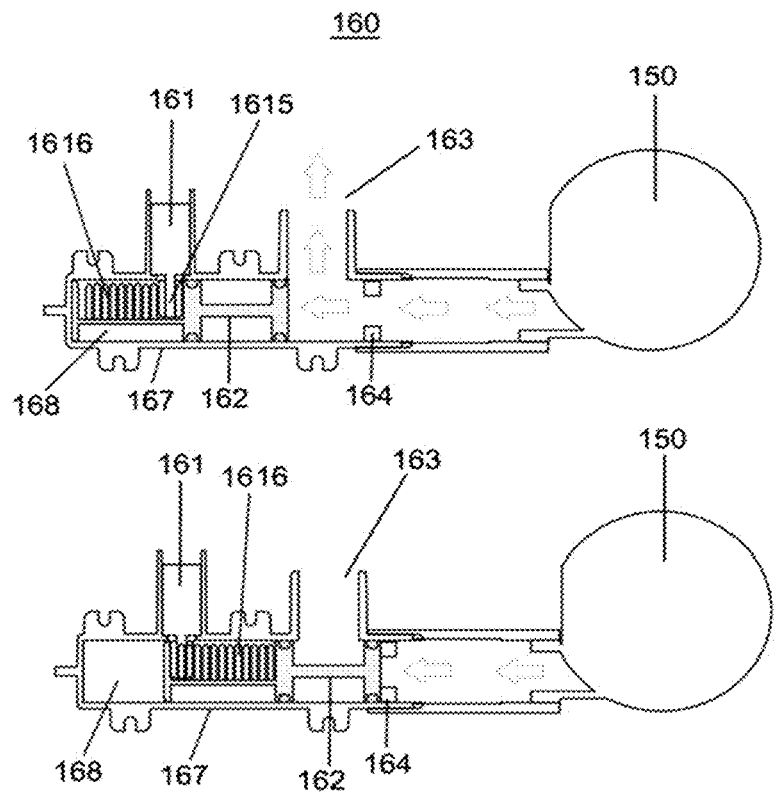
FIG. 6 shows sectional views of an electric gas valve of the gas supply system of the operating unit for a SPA bathtub according to some examples of the present description, in two different operating positions.

FIG. 5 shows a schematic view of the gas supply system of the operating unit for the SPA bathtub according to various examples of the present description. FIG. 6 shows sectional views of an electric gas valve of the gas supply system of the operating unit for the SPA bathtub according to some examples of the present description, located in two different operating positions. FIG. 6 shows partially enlarged views of portion B of FIG. 5 for the electrical gas valve.

The operating unit 200 for the SPA bathtub according to various examples of the present description further may include a gas supply system configured to supply gas to the bathtub. The operating unit 200 further may include an electric gas pump 150 and an electric gas valve 160. The electric gas pump 150 may be configured to be able to be in fluid communication with the SPA bathtub through the electric gas valve 160 and at least one gas path connecting pipe 166 (e.g., 1661, 1662), and the electric gas valve 160 may include a valve housing 167 defining at least one inner cavity 168. The valve housing 167 may be provided with: a gas inlet configured to be in communication with the electric gas pump 150, and at least one gas outlet 163 each configured to be in communication with corresponding one of the at least one gas path connecting pipe 166. The at least one inner cavity 168 is each in fluid communication with a corresponding gas path connecting pipe 166 via one gas outlet 163, and each inner cavity 168 is provided therein with a moving piston 162. The electric gas pump 150 and the electric gas valve 160 may be in communication with the control panel 110 so as to cooperate with each other in such a manner that: during operation of the electric gas pump 150, the moving piston 162 in the electric gas valve 160 is located in a communication position such that the corresponding gas outlet is opened to allow the fluid communication between the electric gas pump 150 and the gas path connecting pipe, and when the electric gas pump 150 receives the operation command of stopping operating from the control panel 110, the moving piston 162 in the electric gas valve 160 moves towards an off position where the corresponding gas outlet is able to be closed to block the fluid communication between the electric gas pump 150 and the gas path connecting pipe, and the electric gas pump 150 stops operating when the moving piston 162 in the electric gas valve 160 reaches the off position.

For the gas supply system of the operating unit for the SPA bathtub according to the various examples of the present description, through the design of the moving piston in the electric gas valve in the operating unit for the SPA bathtub, it is realized that large flow of gas can be supplied when using the electric gas pump to supply gas, and meanwhile the resistance to the electric gas pump is also reduced, thereby improving efficiency of supplying gas to the bathtub.

In some examples of the present description, the electric gas valve 160 further may include an electric motor 161 positioned on the valve housing 167 for driving the moving piston 162. The electric motor 161 may be configured to be rotatable in a first direction and a second direction opposite to each other and include a driving gear 1615 on an output shaft of the electric motor 161. The moving piston 162 is configured to be coupled to a rack 1616 configured to be meshed with the driving gear 1615 of the electric motor 161, such that through the meshing between the driving gear 1615 and the rack 1616, the moving piston 162 can move towards the communication position when the electric motor 161 is rotated in the first direction, and move towards the off position when the electric motor 161 is rotated in the second direction.

In some examples of the present description, a stop portion 164 may be provided in each inner cavity 168 of the valve housing 167. The stop portion 164 may be configured such that the moving piston 162 completely closes the gas outlet 163 when abutting against the stop portion 164. The electric gas valve 160 may be in communication with the control panel 110, and the electric motor 161 operates according to the physical operation command from the control panel 110, so that when the electric gas pump receives the operation command of stopping operating, the moving piston 162 is enabled by the electric motor 161 to move back to a state of abutting against the stop portion 164.

In some examples of the present description, at least one gas path connecting pipe 166 may be configured to be capable of being in fluid communication with the interior volume portion of the SPA bathtub.

In some examples of the present description, the SPA bathtub may be an inflatable bathtub, and the operating unit 200 may include two gas path connecting pipes 166 respectively in communication with two inner cavities 168 of the electric gas valve 160. A first gas path connecting pipe 1661 in the two gas path connecting pipes 166 may be configured to be capable of being connected with an inflation valve of the inflatable bathtub, so that gas from the electric gas pump 150 can be charged into the interior of a bathtub wall of the inflatable bathtub via the inflation valve to inflate the inflatable bathtub. A second gas path connecting pipe 1662 in the two gas path connecting pipes 166 may be configured to be capable of being in fluid communication with the interior volume portion of the inflatable bathtub, so that gas from the electric gas pump 150 can be supplied into the interior volume portion of the inflatable bathtub. It can be understood that, while in various examples of the present description, two gas path connecting pipes are included, and the two gas path connecting pipes are respectively configured to inflate and surf the SPA bathtub, in other examples, the number of gas path connecting pipes is not limited in the present description, that is to say, the number of gas path connecting pipes may be one or more, as long as the purpose of supplying gas to the bathtub can be satisfied. A person skilled in the art could select the specific number of gas path connecting pipes according to actual requirements.

Figure 7:
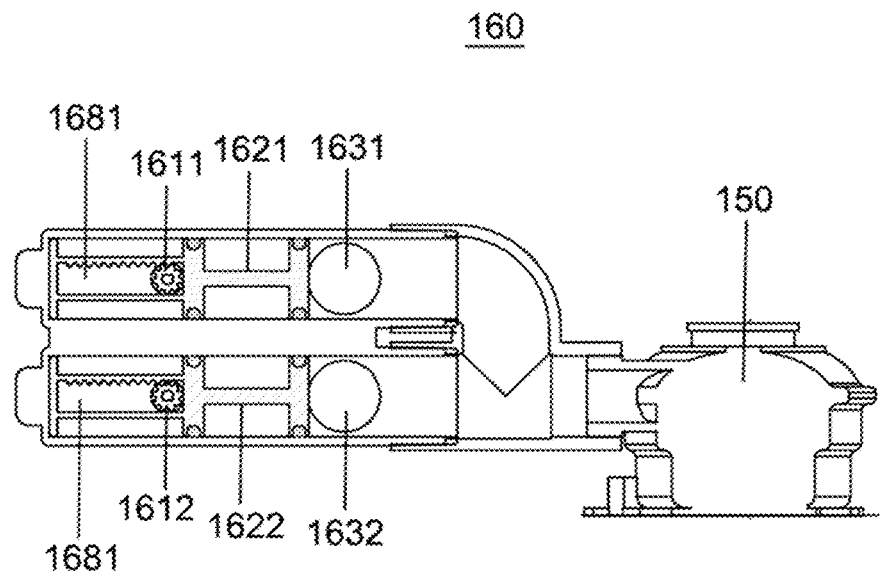
FIG. 7 shows a sectional view of two electric gas valves of the gas supply system of the operating unit for a SPA bathtub according to some examples of the present description.

Referring to FIG. 7, it shows a sectional view of two electric gas valves of the gas supply system of the operating unit for the SPA bathtub according to various examples of the present description. In some examples of the present description, the operating unit 200 may include a first electric motor 1611 configured to drive a first moving piston 1621 provided in a first inner cavity 1681 in communication with the first gas path connecting pipe 1661, and a second electric motor 1612 configured to drive the second moving piston 1622 provided in the second inner cavity 1682 in communication with the second gas path connecting pipe 1662. The first electric motor 1611 and the second electric motor 1612 can be independently operated, and the first electric motor 1611 and the second electric motor 1612 can be configured to cooperate with each other in such a manner that: when the first electric motor 1611 is rotated in the first direction to drive the first moving piston 1621 to move towards the communication position, the second electric motor 1612 is not operated, or the second electric motor 1612 is rotated in the second direction to drive the second moving piston 1622 to move towards the off position; and when the second electric motor 1612 is rotated in the first direction to drive the second moving piston 1622 to move towards the communication position, the first electric motor 1611 is not operated, or the first electric motor 1611 is rotated in the second direction to drive the first moving piston 1621 to move towards the off position.

Referring to FIG. 5, in some examples of the present description, the operating unit 200 further may include a gas pressure monitoring device 165 configured to detect the gas pressure inside the inflatable bathtub, and the gas pressure monitoring device 165 sends, when detecting that the gas pressure inside the inflatable bathtub reaches or is greater than a predetermined gas pressure value, a signal to the control panel 110, so as to generate a physical operation command used for making the first electric motor 1611 rotate in the second direction so as to drive the first moving piston 1621 to move towards the off position.

In some examples of the present description, here, the operating unit 200 can be provided inside the SPA bathtub 400 in a threaded connection manner, or provided outside the SPA bathtub 400 through a hooking device, as described in detail below in connection with FIG. 9.

The operating unit for the SPA bathtub according to various examples of the present description may have a fixed style, can be used with more kinds of bathtubs, can be provided inside the SPA bathtub in a threaded connection manner or outside the SPA bathtub through a hooking device, then it has richer usage scenarios, and wider application scenes, and meanwhile reduces the cost of repeated molding.

Figure 8:
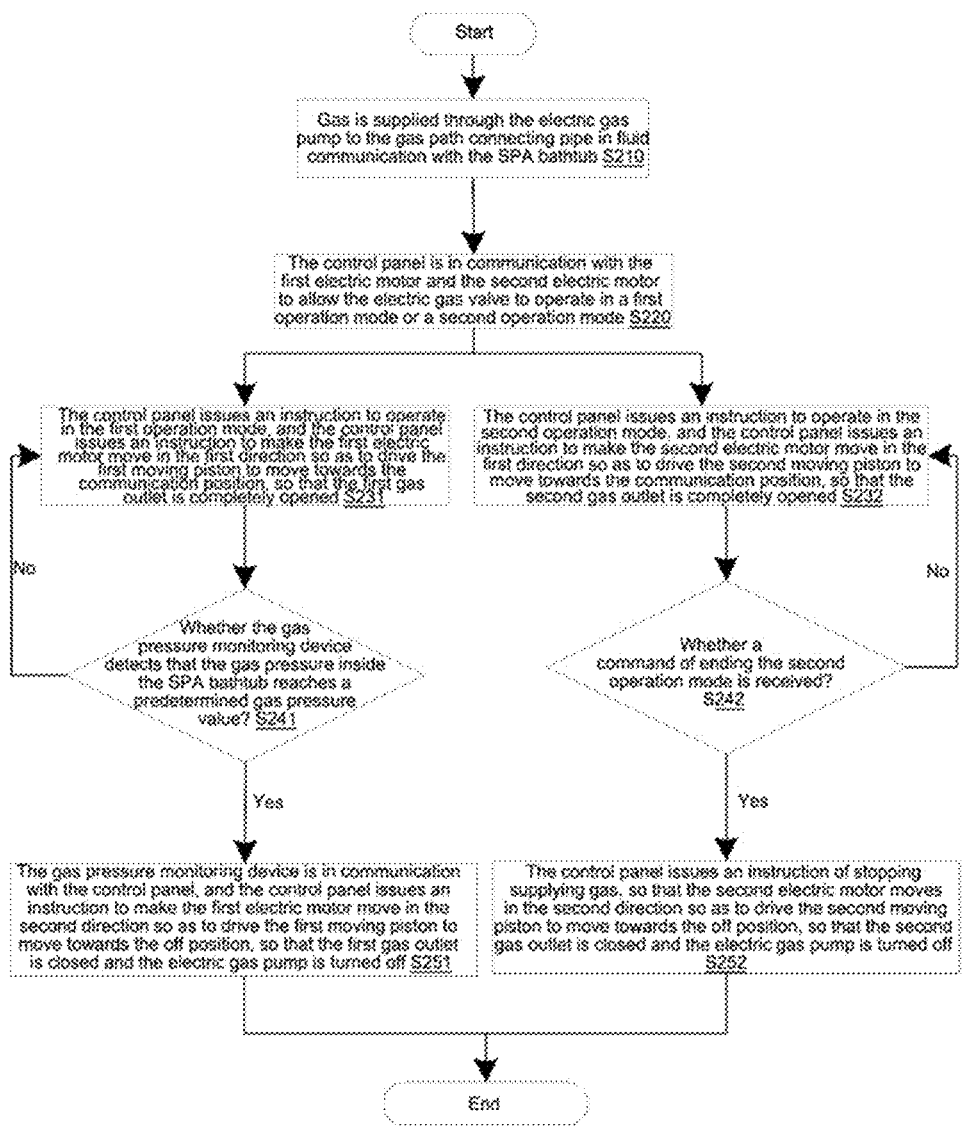
FIG. 8 shows a method of operating a gas supply system for a SPA bathtub according to some examples of the present description.

FIG. 8 shows a method of operating a gas supply system for the SPA bathtub according to various examples of the present description.

In some examples of the present description, as shown in FIG. 8, a method of operating a gas supply system for the SPA bathtub according to the present description may include the following steps. In step S210, a gas is supplied through the electric gas pump to the gas path connecting pipe in fluid communication with the SPA bathtub.

In step S220, the control panel is in communication with the first electric motor and the second electric motor to allow the electric gas valve to operate in a first operation mode or a second operation mode.

In step S231, the control panel issues an instruction to operate in the first operation mode, and the control panel issues an instruction to enable the first electric motor to move in the first direction, so as to drive the first moving piston to move towards the communication position, so that the first gas outlet is completely opened. In step S241, it is judged whether the gas pressure monitoring device detects that the gas pressure inside the SPA bathtub reaches or is greater than a predetermined gas pressure value. If a positive result is obtained in step S241 (i.e., a judgment result in S241 is "Yes"), the method flow proceeds to step S251. In step S251, the gas pressure monitoring device is in communication with the control panel, and the control panel issues an instruction to enable the first electric motor to move in the second direction so as to drive the first moving piston to move towards the off position, so that the first gas outlet is closed, and the electric gas pump is turned off.

In step S232, the control panel issues an instruction to operate in the second operation mode, and the control panel issues an instruction to enable the second electric motor to move in the first direction so as to drive the second moving piston to move towards the communication position, so that the second gas outlet is completely opened.

In step S242, it is judged whether an instruction of ending the second operation mode is received. If a positive result is obtained in step S242 (i.e., a judgment result in S242 is "Yes"), the method flow proceeds to step S252. In step S252, the control panel issues an instruction of stopping supplying gas, so that the second electric motor moves in the second direction so as to drive the second moving piston to move towards the off position, so that the second gas outlet is closed, and the electric gas pump is turned off.

If a negative result is obtained in step S242 (i.e., the judgment result in S242 is "No"), the method flow proceeds to step S232. The method flow proceeds to step S252 until a positive result is obtained in step S242.

In some examples of the present description, the operating unit for the SPA bathtub may include a gas supply system configured to supply gas to the bathtub. Alternatively, the operating unit may include only the gas supply system so as to supply gas to the bathtub. The operating unit is as described in detail with reference to FIG. 4 to FIG. 8. In addition, those skilled in the art could use the operating unit according to some examples of the present description for a storage device according to actual needs. The storage device is configured to store a fluid, especially water. The operating unit is configured to supply gas to the fluid in the storage device. In particular, the operating unit may supply the storage device with gas in one or more modes (e.g. inflation mode or surf mode).

The method of operating a gas supply system for the SPA bathtub according to various examples of the present description, through the design of the moving piston in the electric gas valve in the operating unit for the SPA bathtub, realizes that large flow of gas can be supplied when using the electric gas pump to supply gas, meanwhile also reduces the resistance to the electric gas pump, and thus can improve the efficiency of supplying gas to the bathtub.

Figure 9:
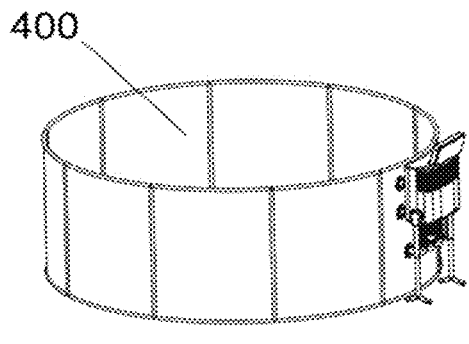
FIG. 9 shows SPA bathtubs according to some examples of the present description.
Figure 9:
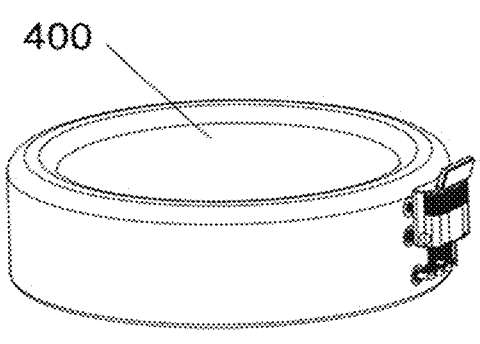
Figure 9:
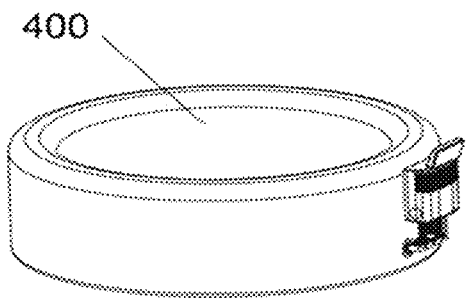
Figure 9:
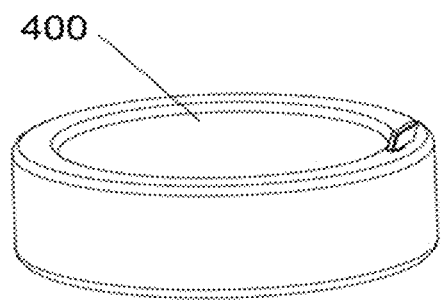

Referring to FIG. 9, FIG. 9 shows the SPA bathtub according to various examples of the present description. Further examples of the present description provide the SPA bathtub 400. The SPA bathtub 400 includes the operating unit 100 according to some examples of the present description.

As shown in FIG. 9, the SPA bathtub of various examples of the present description includes the operating unit for the SPA bathtub according to some examples of the present description, and the operating unit for the SPA bathtub can be provided inside the SPA bathtub in a threaded connection manner, or is provided outside the SPA bathtub as a hanging plate.

(A) of FIG. 9 shows an installation form of a skeleton bathtub, and the operating unit for controlling a bathtub, according to various examples of the present description, can be provided inside the SPA bathtub in a threaded connection manner. (B) of FIG. 9 shows an external installation form of an inflatable bathtub, and the operating unit for controlling a bathtub according to some examples of the present description can be provided outside the SPA bathtub in a threaded connection manner. (C) of FIG. 9 shows an external installation form of an inflatable bathtub, and the operating unit for controlling a bathtub according to various examples of the present description can be provided outside the SPA bathtub through a hooking device. (D) of FIG. 9 shows a built-in installation form of an inflatable bathtub, and the operating unit for controlling a bathtub according to some examples of the present description can be provided inside the SPA bathtub in a threaded connection manner.

By using the operating unit according to the various examples of the present description, the SPA bathtub according to some examples of the present description enables the use of the bathtub to be no longer restricted by the water level in the bathtub, so that water circulation of the water in the SPA bathtub still can be realized even in the case of a low water level, thereby assisting in realizing heating or filtering of the water in the SPA bathtub, so that the problem of having to be installed at a low water level is resolved in the related technical field. The installation of the operating unit for the SPA bathtub according to some examples of the present description no longer needs a fixed height, and the installation and use are easier. The operating unit for the SPA bathtub according to various examples of the present description may have a fixed style, and can be used with more kinds of bathtubs, then it has richer usage scenarios, and wider application scenes, and meanwhile reduces the cost of repeated molding.

Although the present description has been described with reference to various examples, it should be understood that the present description is not limited to the specific examples described and illustrated in detail herein. Those skilled in the art could make various changes to the examples without departing from the scope defined by the claims of the present description.

Features mentioned and/or shown in the description of examples of the present description in the above may be incorporated into one or more other examples in the same or similar manner, and combined with the features in other examples or replace corresponding features in other examples. These technical solutions obtained through combination or replacement should also be considered as being included in the scope of protection of the present description.

What is claimed is:

1. An operating unit for a SPA bathtub, the operating unit detachably attached to the SPA bathtub, and the operating unit comprising:
    a water circulation system configured to perform out-of-bathtub circulation of water in the SPA bathtub, wherein the water circulation system comprises:
        a diaphragm self-priming pump, a peristaltic pump, a water circulation pipeline, and a fluid switch assembly connecting the diaphragm self-priming pump and the peristaltic pump with the water circulation pipeline, the peristaltic pump is provided in such a manner that an inlet of the peristaltic pump can be in fluid communication with an interior volume portion of the SPA bathtub and an outlet of the peristaltic pump is in fluid communication with an inlet of the fluid switch assembly, the diaphragm self-priming pump is provided in such a manner that an inlet of the diaphragm self-priming pump is in fluid communication with the outlet of the peristaltic pump and an outlet of the diaphragm self-priming pump can be in fluid communication with an outlet of the fluid switch assembly, and the water circulation pipeline is provided in such a manner that an inlet of the water circulation pipeline is in fluid communication with the outlet of the fluid switch assembly and an outlet of the water circulation pipeline is in fluid communication with the interior volume portion of the SPA bathtub,
        wherein the diaphragm self-priming pump, the peristaltic pump, and the fluid switch assembly are configured to cooperate with each other in such a manner that: the diaphragm self-priming pump operates before the peristaltic pump operates normally and stops operating after the peristaltic pump operates normally, and the fluid switch assembly has a first operation state and a second operation state,
        wherein during operation of the diaphragm self-priming pump, the fluid switch assembly is in the first operation state, so that water from the interior volume portion of the SPA bathtub flows through the peristaltic pump, the diaphragm self-priming pump, the fluid switch assembly, and the water circulation pipeline in sequence and finally returns back to the interior volume portion of the SPA bathtub, and during operation of the peristaltic pump, the fluid switch assembly is in the second operation state, so that the water from the interior volume portion of the SPA bathtub flows through the peristaltic pump, the fluid switch assembly, and the water circulation pipeline in sequence and finally returns back to the interior volume portion of the SPA bathtub, and
        wherein the fluid switch assembly comprises:
            a housing member, wherein a first cavity and a second cavity are provided in the housing member along a longitudinal direction of the housing member, the first cavity and the second cavity are in fluid communication with each other via a first opening, the outlet of the peristaltic pump and the inlet of the diaphragm self-priming pump are both in fluid communication with the first cavity, the outlet of the diaphragm self-priming pump and the inlet of the water circulation pipeline both in fluid communication with the second cavity; and
            a fluid switch piston, wherein the fluid switch piston is received in the second cavity and configured to be movable in the second cavity,
            wherein during the operation of the diaphragm self-priming pump, the fluid switch piston is located in a first operating position so as to close the first opening, and during the operation of the peristaltic pump, the fluid switch piston moves from the first operating position to a second operating position,
            wherein the second operating position allows fluid communication between the first cavity and the second cavity, and
            at least one first magnet positioned in the second cavity and at least one second magnet positioned on the fluid switch piston and opposite to the first magnet, the first magnet and the second magnet are provided in such a manner that ends having same polarity are opposite to each other, and an interaction force between the first magnet and the second magnet is set to be suitable for maintaining the fluid switch piston in the first operating position and is less than an operating fluid pressure of the peristaltic pump.

2. The operating unit of claim 1, wherein the fluid switch assembly further comprises a biasing device mounted in the second cavity, the biasing device abuts against the fluid switch piston and configured to apply a biasing force to the fluid switch piston towards the first operating position, wherein a sum of the biasing force and the interaction force between the first magnet and the second magnet is less than the operating fluid pressure of the peristaltic pump.

3. The operating unit of claim 1, wherein the operating unit can be provided inside the SPA bathtub in a threaded connection manner or outside the SPA bathtub through a hooking device.

4. The operating unit of claim 1, wherein the operating unit further comprises:
    a plurality of sensors; and
    a control panel in communication with the plurality of sensors,
    wherein the plurality of sensors are configured to measure an operation state of the SPA bathtub and send to the control panel a signal indicating the operation state of the SPA bathtub, and
    wherein the control panel is configured to receive an external input instruction for controlling operation of the SPA bathtub, the signal indicating the operation state of the SPA bathtub, and convert the external input instruction and the signal into a physical operation command for the SPA bathtub.

5. The operating unit of claim 4, wherein the operating unit further comprises:
    a heater configured to heat the water circulation pipeline, wherein the heater is in communication with the control panel, and
    wherein the plurality of sensors comprise an inductor provided at an outside of the housing member, the inductor positioned close to an end of the first magnet facing the second magnet and configured to:

send a first output signal to the control panel when a distance between the second magnet and the first magnet is less than or equal to a preset spacing value, so as to generate a start operating operation command for the heater, and send a second output signal to the control panel when the distance between the second magnet and the first magnet is greater than the preset spacing value, so as to generate a stop operating operation command for the heater.

6. The operating unit of claim 5, wherein the operating unit further comprises:

an electric gas pump; and an electric gas valve, wherein the electric gas pump is configured to be able to be in fluid communication with the SPA bathtub through the electric gas valve and at least one gas path connecting pipe, wherein the electric gas valve comprises a valve housing defining at least one inner cavity, the valve housing provided with a gas inlet configured to be in communication with the electric gas pump, and at least one gas outlet each configured to be in communication with corresponding one of the at least one gas path connecting pipe, wherein the at least one inner cavity is each in fluid communication with a corresponding gas path connecting pipe via one gas outlet, and each inner cavity is provided therein with a moving piston, wherein the electric gas pump and the electric gas valve are in communication with the control panel so as to cooperate with each other in such a manner that: during operation of the electric gas pump, the moving piston in the electric gas valve is located in a communication position such that the corresponding gas outlet is opened to allow the fluid communication between the electric gas pump and the gas path connecting pipe, and in response to the electric gas pump receiving a stop operating operation command from the control panel, the moving piston in the electric gas valve moves towards an off position where the corresponding gas outlet is able to be closed to block the fluid communication between the electric gas pump and the gas path connecting pipe, and the electric gas pump stops operating when the moving piston in the electric gas valve reaches the off position.

7. The operating unit of claim 5, wherein the plurality of sensors further comprise:

at least one temperature sensor, a leakage inductor provided on the housing member of the fluid switch assembly, or a combination thereof, wherein the leakage inductor is configured to send a first signal to the control panel in response to sensing a current having a value greater than a preset current value in the water flowing through the fluid switch assembly to generate a power off operation command for the operating unit, and wherein the at least one temperature sensor is configured to send a second signal to the control panel in response to sensing a temperature of the water flowing through the fluid switch assembly is higher than a preset temperature value to generate a stop operating operation command for the operating unit.

8. The operating unit of claim 7, wherein the operating unit further comprises:

an electric gas pump; and an electric gas valve, wherein the electric gas pump is configured to be able to be in fluid communication with the SPA bathtub through the electric gas valve and at least one gas path connecting pipe, wherein the electric gas valve comprises a valve housing defining at least one inner cavity, the valve housing provided with a gas inlet configured to be in communication with the electric gas pump, and at least one gas outlet each configured to be in communication with corresponding one of the at least one gas path connecting pipe, the at least one inner cavity is each in fluid communication with a corresponding gas path connecting pipe via one gas outlet, and each inner cavity is provided therein with a moving piston, wherein the electric gas pump and the electric gas valve are in communication with the control panel so as to cooperate with each other in such a manner that: during operation of the electric gas pump, the moving piston in the electric gas valve is located in a communication position such that the corresponding gas outlet is opened to allow the fluid communication between the electric gas pump and the gas path connecting pipe, and when the electric gas pump receives a stop operating operation command from the control panel, the moving piston in the electric gas valve moves towards an off position where the corresponding gas outlet is able to be closed to block the fluid communication between the electric gas pump and the gas path connecting pipe, and the electric gas pump stops operating when the moving piston in the electric gas valve reaches the off position.

9. The operating unit of claim 4, wherein the operating unit further comprises:

an electric gas pump; and an electric gas valve, the electric gas pump configured to be able to be in fluid communication with the SPA bathtub through the electric gas valve and at least one gas path connecting pipe, and the electric gas valve comprising:

a valve housing defining at least one inner cavity, the valve housing provided with a gas inlet configured to be in communication with the electric gas pump; and at least one gas outlet each configured to be in communication with corresponding one of the at least one gas path connecting pipe, wherein the at least one inner cavity is each in fluid communication with a corresponding gas path connecting pipe via one gas outlet, wherein each inner cavity is provided therein with a moving piston, and wherein the electric gas pump and the electric gas valve are in communication with the control panel so as to cooperate with each other in such a manner that: during operation of the electric gas pump, the moving piston in the electric gas valve is located in a communication position such that the corresponding gas outlet is opened to allow the fluid communication between the electric gas pump and the gas path connecting pipe, and in response to the electric gas pump receiving a stop operating operation command from the control panel, the moving piston in the electric gas valve moves towards an off position where the corresponding gas outlet is able to be closed to block the fluid communication between the electric gas pump and the gas path connecting pipe, and the electric gas pump stops operating when the moving piston in the electric gas valve reaches the off position.

10. The operating unit of claim 9, wherein the electric gas valve further comprises an electric motor positioned on the valve housing and configured for driving the moving piston,
   wherein the electric motor is configured to be rotatable in a first direction and a second direction, the first direction and the second direction opposite to each other and comprises a driving gear on an output shaft of the electric motor, and
   wherein the moving piston is configured to be coupled to a rack configured to be meshed with the driving gear of the electric motor, such that the moving piston can move, through meshing between the driving gear and the rack, towards the communication position when the electric motor is rotated in the first direction, and move towards the off position when the electric motor is rotated in the second direction.

11. The operating unit of claim 10, wherein the at least one gas path connecting pipe is configured to be capable of being in fluid communication with the interior volume portion of the SPA bathtub.

12. The operating unit of claim 10, wherein a stop portion is provided in each inner cavity of the valve housing, the stop portion configured such that the moving piston completely closes the gas outlet when abutting against the stop portion, the electric gas valve is in communication with the control panel, and the electric motor operates according to the physical operation command from the control panel, so that when the electric gas pump receives the stop operating operation command, the moving piston is enabled by the electric motor to move back to a state of abutting against the stop portion.

13. The operating unit of claim 12, wherein the at least one gas path connecting pipe is configured to be capable of being in fluid communication with the interior volume portion of the SPA bathtub.

14. The operating unit of claim 12, wherein the SPA bathtub is an inflatable bathtub, the operating unit comprising:
   two gas path connecting pipes respectively in communication with two inner cavities of the electric gas valve,
   wherein a first gas path connecting pipe in the two gas path connecting pipes is configured to be capable of being connected with an inflation valve of the inflatable bathtub, so that gas from the electric gas pump can be charged into an interior of a bathtub wall of the inflatable bathtub via the inflation valve to inflate the inflatable bathtub, and
   wherein a second gas path connecting pipe in the two gas path connecting pipes is configured to be capable of being in fluid communication with the interior volume portion of the inflatable bathtub, so that the gas from the electric gas pump can be supplied into the interior volume portion of the inflatable bathtub.

15. The operating unit of claim 10, wherein the SPA bathtub is an inflatable bathtub, and wherein the operating unit comprises:
   two gas path connecting pipes respectively in communication with two inner cavities of the electric gas valve,
   wherein a first gas path connecting pipe of the two gas path connecting pipes is configured to be capable of being connected with an inflation valve of the inflatable bathtub, so that gas from the electric gas pump can be charged into an interior of a bathtub wall of the inflatable bathtub via the inflation valve to inflate the inflatable bathtub, and
   wherein a second gas path connecting pipe of the two gas path connecting pipes is configured to be capable of being in fluid communication with the interior volume portion of the inflatable bathtub, so that the gas from the electric gas pump can be supplied into the interior volume portion of the inflatable bathtub.

16. The operating unit of claim 15, wherein the operating unit comprises:
   a first electric motor configured to drive a first moving piston provided in a first inner cavity in communication with the first gas path connecting pipe; and
   a second electric motor configured to drive the second moving piston provided in the second inner cavity in communication with the second gas path connecting pipe,
   wherein the first electric motor and the second electric motor are configured to be independently operated, and the first electric motor and the second electric motor are configured to cooperate with each other in such a manner that: when the first electric motor is rotated in the first direction to drive the first moving piston to move towards the communication position, the second electric motor is not operated, or the second electric motor is rotated in the second direction to drive the second moving piston to move towards the off position; and when the second electric motor is rotated in the first direction to drive the second moving piston to move towards the communication position, the first electric motor is not operated, or the first electric motor is rotated in the second direction to drive the first moving piston to move towards the off position.

17. The operating unit of claim 16, wherein the operating unit further comprises a gas pressure monitoring device configured to detect gas pressure inside the inflatable bathtub, the gas pressure monitoring device configured to send, in response to detecting that the gas pressure inside the inflatable bathtub is equivalent to or is greater than a predetermined gas pressure value, a second signal to the control panel, so as to generate the physical operation command, the physical operation command to cause the first electric motor to rotate in the second direction so as to drive the first moving piston to move towards the off position.

18. A SPA bathtub comprising the operating unit of claim 1.

* * * * *